Patented July 19, 1932

1,867,954

UNITED STATES PATENT OFFICE

MEINDERT DANIUS ROZENBROEK, OF DELDEN, NETHERLANDS

PROCESS FOR SULPHONATING FATTY ACIDS AND FATTY ACID DERIVATIVES

No Drawing. Application filed June 21, 1928, Serial No. 287,352, and in the Netherlands July 9, 1927.

The invention relates to a process for sulphonating fatty acids and fatty acid derivatives. Generally concentrated sulphuric acid is used for this purpose and mostly in such a way that to four parts of oil, e. g. castor oil, one part of concentrated sulphuric acid is carefully added under constant cooling.

It was found that oil mordants may be obtained which are particularly excellent in their application, when the action of sulphuric acid is allowed to take place in the presence of dehydrating means, as concentrated phosphoric acid, phosphorous acid, substituted chlorine compounds of the anhydrides of these acids, inorganic chlorine- or oxygen compounds of phosphorus or mixtures thereof.

Besides, instead of using sulphuric acid, fuming sulphuric acid of a varying $SO_3$ percentage or also chlorosulphonic acid may be used. According to the purpose in view with the further application of the sulphonated product and also in connection with the character of the fatty acid or fatty acid derivative to be sulphonated, e. g. esters, fatty acid chlorides and sulfoleates, the following combinations may be used:

Fuming sulphuric acid and phosphoric acid;

Sulphuric acid, phosphorous trichloride or phosphorus pentachloride;

Fuming sulphuric acid, phosphorous trichloride or phosphorus pentachloride;

Chlorosulphonic acid and phosphorus oxychloride;

Fuming sulphuric acid, sulphuric acid and phosphoric acid.

It will depend on the degree of sulphonation desired whether larger or smaller concentrations of the dehydrating agents are applied. With esters of some oxy-acids one will be able to locate the sulphonation in certain parts of the oil molecule with the aid of combinations empirically to be determined according to the above discussion.

It sometimes occurs that the reaction products form a viscous somewhat tough substance, which is but difficultly to be worked up, especially if in connection with the degree of sulphonation an excess of sulphuric acid or fuming sulphuric acid is used, dependent on the raw-material and the product to be obtained. It has appeared, however, that this difficulty is easily to be removed if a waterfree thinning agent, e. g. acetic acid is applied. A particularly suitable combination is: sulphuric acid, acetic acid and phosphorus trichloride. Here the dehydrating agent is in substance phosphorus trichloride; the sulphonating agent is sulphuric acid. If these two functions are combined in one component, consequently in fuming acid, then the phosphorus trichloride may be omitted. By applying acetic acid as thinning agents both without and with simultaneous application of a phosphorus compound it is attained that the advantage of the intensive sulphonation, apart from eliminating the disadvantage of the reaction products which are sometimes difficultly to be worked up, is maintained.

The processes mentioned in the last paragraph may still advantageously be improved by using the reaction product of sulphuric acid or fuming sulphuric acid, whether or not together with chlorosulphonic acid and acetic acid, in which case the acetic acid may be anhydrous, i. e. of 100% or also of a lower percentage. Hereby the advantage of lower viscosity and besides the great advantage of an only small rise of temperature during the sulphonation process is obtained. This process may at will be combined with others and thus it may be applied together with e. g. phosphorus trichloride, phosphoric acid, etc.

As examples of some very suitable combinations for the sulphonation the following may be mentioned:

1. 100 parts of castor oil are sulphonated with 45 parts of fuming sulphuric acid containing 50% free $SO_3$ and 25 parts of phosphoric acid.

2. To 100 parts of the sulfoleate of castor oil 40 parts of sulphuric acid and 30 parts of phosphorus trichloride are added.

3. 100 parts of castor oil are treated with 20 parts phosphorus trichloride and with 70 parts of a mixture, consisting of 50 parts of fuming sulphuric acid containing 50% free $SO_3$, 10 parts of phosphoric acid and 10 parts of acetic acid.

The control conditions and the steps to be followed in the practice of the invention, as described in the above examples, are as follows: the material to be sulphonated, the sulphonating agent, and the water extracting auxiliary substances, which may be either mixed with the sulphonating agent or added separately, are preliminarily cooled as much as possible and preferably to about —5° C. During the reaction, cooling is continually employed in order to keep the temperature as low as possible and to insure that the reaction temperature does not rise above 25° C. Upon completion of sulphonation (which may be ascertained by determining whether a sample of the sulphonation mixture dissolves in a very dilute acid, e. g. 2% sulphuric acid), the sulphonation mixture is dissolved in ice water and is freed in a known way from the excess of acid.

With the action of some of the dehydrating reaction components as mentioned hereinabove on certain fatty acids or fatty acid derivates, e. g. phosphorus trichloride on castor oil, difficulties arise on account of heavy thickening of the reaction product.

In order to prevent the difficulty described in the preceding paragraph, initial sulphonation of the starting material is had by adding 20 parts of sulphuric acid and phosphorus trichloride to 100 parts of the material to be sulphonated, e. g. castor oil. Subsequently, the remainder of the sulphonating agent, for instance, 50 parts of sulphuric acid, is added, and followed by a further addition of phosphorous trichloride.

The sulphonation being finished the obtained reaction product may be worked up in the usual way e. g. by removing by washing out and/or neutralization in a known manner of the remaining free acid.

The products obtained by use of the process have amongst other things the properties of being durable against alkaline earths, acid and alkali (lye).

I claim:

1. A process of sulphonating fatty acids and their esters, comprising sulphonating the material with a sulphonating agent in the presence of a dehydrating phosphorus compound.

2. A process of sulphonating fatty acids and their esters, comprising sulphonating the material with sulphuric acid containing free $SO_3$ in the presence of phosphoric acid.

3. A process of sulphonating fatty acids and their esters, comprising sulphonating the material with sulphuric acid in the presence of the dehydrating compound phosphorus trichloride.

4. A process of sulphonating fatty acids and their esters, comprising sulphonating the material with sulphuric acid in the presence of a dehydrating compound of phosphorus.

In testimony whereof I affix my signature.

MEINDERT DANIUS ROZENBROEK.